United States Patent
Suzuki et al.

(10) Patent No.: US 7,552,003 B2
(45) Date of Patent: Jun. 23, 2009

(54) CONTROL APPARATUS AND CONTROL METHOD FOR HYBRID VEHICLE

(75) Inventors: Yoshitaka Suzuki, Toyota (JP); Hiroatsu Endo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 401 days.

(21) Appl. No.: 11/058,249

(22) Filed: Feb. 16, 2005

(65) Prior Publication Data

US 2005/0203678 A1 Sep. 15, 2005

(30) Foreign Application Priority Data

Mar. 12, 2004 (JP) .............................. 2004-071001

(51) Int. Cl.
*H02P 17/00* (2006.01)
*B60K 1/02* (2006.01)
*G06F 7/00* (2006.01)
*G06F 17/00* (2006.01)

(52) U.S. Cl. .............................. 701/51; 477/15; 477/16; 903/945

(58) Field of Classification Search ................. 903/945, 903/915, 917; 701/51, 52, 58, 65; 180/65.2, 180/65.6, 65.7; 477/15, 16, 20
See application file for complete search history.

(56) References Cited

U.S. PATENT DOCUMENTS

| | | | |
|---|---|---|---|
| 6,428,444 B1 * | 8/2002 | Tabata ............................ | 477/3 |
| 6,867,509 B1 * | 3/2005 | Takaoka et al. ........... | 290/40 A |
| 6,907,337 B2 * | 6/2005 | Phillips et al. ................. | 701/51 |
| 2001/0020789 A1 * | 9/2001 | Nakashima ................ | 290/40 C |
| 2002/0105188 A1 * | 8/2002 | Tomikawa ................. | 290/40 C |
| 2004/0044458 A1 * | 3/2004 | Kadota ......................... | 701/55 |
| 2005/0054479 A1 * | 3/2005 | Masterson et al. ............. | 477/3 |
| 2005/0060079 A1 * | 3/2005 | Phillips et al. ................. | 701/53 |

FOREIGN PATENT DOCUMENTS

| | | |
|---|---|---|
| DE | 10 2004 026252 A1 | 2/2005 |
| DE | 10 2004 034401 A1 | 2/2005 |
| EP | 1 304 248 A1 | 4/2003 |
| EP | 1 386 771 A2 | 2/2004 |
| JP | A 4-4353 | 1/1992 |
| JP | A 7-233866 | 9/1995 |
| JP | A 2002-225578 | 8/2002 |

OTHER PUBLICATIONS

U.S. Appl. No. 60/501,766, filed Sep. 10, 2003.

* cited by examiner

*Primary Examiner*—Thomas G Black
*Assistant Examiner*—Christine M Behncke
(74) *Attorney, Agent, or Firm*—Kenyon & Kenyon LLP

(57) ABSTRACT

A control method for a hybrid vehicle which includes an engine, a first motor/generator, a second motor/generator, and a manual changing device that changes a driven state of an output member of the engine that depends on a driving state of the engine and a driving state of the second motor/generator, includes the steps of detecting required driving force of the vehicle; detecting required output torque of the second motor/generator based on the required driving force when a change in a rotational speed of the engine is detected; comparing the detected required torque to the maximum permissible torque of the second motor/generator, and increasing a gear ratio when it is determined that the required output torque is greater than the maximum permissible torque.

8 Claims, 6 Drawing Sheets

CONTROL APPARATUS AND CONTROL METHOD FOR HYBRID VEHICLE

INCORPORATION BY REFERENCE

The disclosure of Japanese Patent Application No. 2004-071001 filed on Mar. 12, 2004, including the specification, drawings and abstract is incorporated herein by reference in its entirety.

BACKGROUND OF THE INVENTION

1. Field of the Invention

The invention relates to a control apparatus and a control method for a hybrid vehicle including plural driving sources.

2. Description of the Related Art

As a hybrid vehicle, for example, a vehicle which includes a motor or motor/generator as a power source in addition to an internal combustion engine is known. In this example of the hybrid vehicle, an engine rotational speed is controlled by the motor or the motor/generator connected to a planetary gear mechanism so that the internal combustion engine is operated at an optimal operating point, using a differential effect of the planetary gear mechanism. Also, at the time of acceleration, excess or deficiency of driving force or driving force required by an engine brake is compensated for by the motor or the motor/generator. Further, at the time of deceleration, energy is regenerated, whereby exhaust gas discharged from the internal combustion engine is reduced, and fuel efficiency is improved at the same time.

As an example of the hybrid vehicle, a drive apparatus for a hybrid vehicle is disclosed in Japanese Patent Application Publication No. JP-A-2002-225578. In the drive apparatus, an engine, a first motor/generator, and an output member are connected to each other through a power splitting mechanism, and a second motor/generator is connected to the output member. Output of the engine is split and transmitted to the output member and the first motor/generator by the power splitting mechanism. Also, the second motor/generator is driven by electric power generated by the first motor/generator. Thus, torque of the output member is increased or decreased. Further, the engine rotational speed is maintained on an optimal fuel efficiency line by controlling the rotational speed of the first motor/generator. Thus, the fuel efficiency can be improved.

Meanwhile, it is conceivable to manually change the rotational speed of the first motor/generator. By manually changing the rotational speed of the first motor/generator, the engine rotational speed can be made equal to a rotational speed required by a driver, and driveability can be improved. However, when downshifting is performed according to manual operation without changing an operational state of an accelerator pedal, the engine rotational speed is increased while the engine output is maintained at a constant value. Therefore, the output toque of the engine is relatively decreased. As a result, torque that is directly transmitted from the engine to an output shaft is reduced. Therefore, in order to avoid or suppress a decrease in the driving force, the required torque of the second motor/generator based on the required output of the second motor/generator becomes large. Accordingly, size of the second motor/generator needs to be increased for providing the required torque of the second motor/generator. Otherwise, the second motor/generator may not be able to provide the required output due to a limit of the rotational speed of the second motor/generator.

SUMMARY OF THE INVENTION

It is an object of the invention to suppress an increase of size of a motor and to provide required driving force.

A control apparatus according to the invention detects required driving force of a vehicle, and changes a gear ratio of a transmission according to the detected required driving force. More specifically, a first aspect of the invention relates to a control apparatus for a hybrid vehicle in which a conversion device that converts thermal energy to kinetic energy, a first driving force source that has a function of generating electric power, and an output member are connected to each other through a power splitting mechanism that produces a differential effect; a second driving force source is connected to the output member through a transmission in which a gear ratio can be changed; and a manual changing device for changing, according to manual operation, a driven state of the output member that depends on a driving state of the conversion device and a driving state of the second driving force source is provided. The control apparatus includes a first detection device that detects required driving force of the vehicle; a second detection device that obtains a required output value that is a value of required output of the second driving force source, based on the detected required driving force when the driven state of the output member that depends on the driving state of the conversion device and the driving state of the second driving force source is changed by the manual changing device; a comparison device that compares the obtained required output value to an upper limit value of output that can be transmitted to the output member from the second driving force source at the gear ratio of the transmission after the driven state of the output member is changed; and a shifting control device that adjusts the gear ratio of the transmission so as to increase the upper limit value of the output that can be transmitted to the output member from the second driving force source when the required output value is greater than the upper limit value.

The shifting control device may adjust the gear ratio of the transmission so that the upper limit value of the output that can be transmitted to the output member from the second driving force source becomes equal to the required output value. In this case, the shifting control device may adjust the gear ratio of the transmission so that the upper limit value of the output that can be transmitted to the output member from the second driving force source becomes completely equal to the required output value. Also, the shifting control device may adjust the gear ratio of the transmission so that the upper limit value of the output that can be transmitted to the output member from the second driving force source becomes substantially equal to the required output value. Also, when the transmission is a multi-speed transmission, the shifting control device may control the transmission so that a shift speed is set to a speed at which the upper limit value of the output that can be transmitted to the output member from the second driving force source becomes closest to the required output value, among multiple shift speeds.

A second aspect of the invention relates to a control apparatus for a hybrid vehicle in which an internal combustion engine, a first driving force source that has a function of generating electric power, and an output member are connected to each other through a power splitting mechanism that produces a differential effect; a second driving force source is connected to the output member through a transmission in which a gear ratio can be changed; and a manual changing device that changes, according to manual operation, a driven state of the output member that depends on a driving state of the internal combustion engine and a driving state of the second driving force source is provided. The control apparatus includes a first detection device that detects required driving force of the vehicle; a required torque detection device that obtains required output torque of the second driving force source, based on the detected required driving force when the driven state of the output member that depends on the driving state of the internal combustion engine and the driving state of the second driving force source is changed by the manual changing device; a comparison device that compares the obtained required output torque to an upper limit value of torque that can be transmitted to the output member from the second driving force source at the gear ratio of the transmission after the driven state of the output member is changed; and a shifting control device that increases the gear ratio of the transmission when the required output torque is greater than the upper limit value.

In the control apparatus according to the second aspect of the invention, the required driving force is detected when a rotational speed of the internal combustion engine is changed, the required torque is calculated based on the detected required driving force, the calculated required torque is compared to the maximum permissible torque of the second driving force source, and the gear ratio of the transmission is changed so as to decrease a rotational speed of the output member when the required torque is greater than the maximum permissible torque. Therefore, since the output torque of the transmission can be increased, it is possible to provide the required torque, and to prevent an increase in size of the second driving force source.

A third aspect of the invention relates to a control apparatus for a hybrid vehicle in which an internal combustion engine, a first driving force source that has a function of generating electric power, and an output member are connected to each other through a power splitting mechanism that produces a differential effect; a second driving force source is connected to the output member through a transmission in which a gear ratio can be changed; and a manual changing device that changes, according to manual operation, a driven state of the output member that depends on a driving state of the internal combustion engine and a driving state of the second driving force source is provided. The control apparatus includes a first detection device that detects required driving force of the vehicle; a required rotational speed detection device that obtains a required rotational speed of the second driving force source, based on the detected required driving force when the driven state of the output member that depends on the driving state of the internal combustion engine and the driving state of the second driving force source is changed by the manual changing device; a rotational speed comparison device that compares the obtained required rotational speed to a predetermined upper limit value of the rotational speed of the second driving force source at the gear ratio of the transmission after the driven state of the output member is changed; and a gear ratio reduction device that reduces the gear ratio of the transmission when the required rotational speed is higher than the upper limit value.

In the control apparatus according to the third aspect of the invention, the required driving force is detected when the rotational speed of the internal combustion engine is changed, the required rotational speed is calculated based on the detected required driving force, the calculated required rotational speed is compared to the maximum permissible rotational speed of the second driving force source, and the gear ratio of the transmission is changed so as to increase the rotational speed of the output member. Therefore, since the output rotational speed of the transmission can be increased, it is possible to achieve the required rotational speed, and to prevent an increase in size of the second driving force source.

A fourth aspect of the invention relates to a control method for a hybrid vehicle in which a conversion device that converts thermal energy to kinetic energy, a first driving force source that has a function of generating electric power, and an output member are connected to each other through a power splitting mechanism that produces a differential effect; a second driving force source is connected to the output member through a transmission in which a gear ratio can be changed; and manual changing device for changing, according to manual operation, a driven state of the output member that depends on a driving state of the conversion device and a driving state of the second driving force source is provided. The control method includes the steps of obtaining required driving force of the vehicle; obtaining a required output value that is a value of required output of the second driving force source, based on the obtained required driving force when the driven state of the output member that depends on the driving state of the conversion device and the driving state of the second driving force source is changed by the manual changing device; comparing the obtained required output value to an upper limit value of output that can be transmitted to the output member from the second driving force source at the gear ratio of the transmission after the driven state of the output member is changed; and adjusting the gear ratio of the transmission so as to increase the upper limit value of the output that can be transmitted to the output member from the second driving force source when the required output value is greater than the upper limit value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 2:
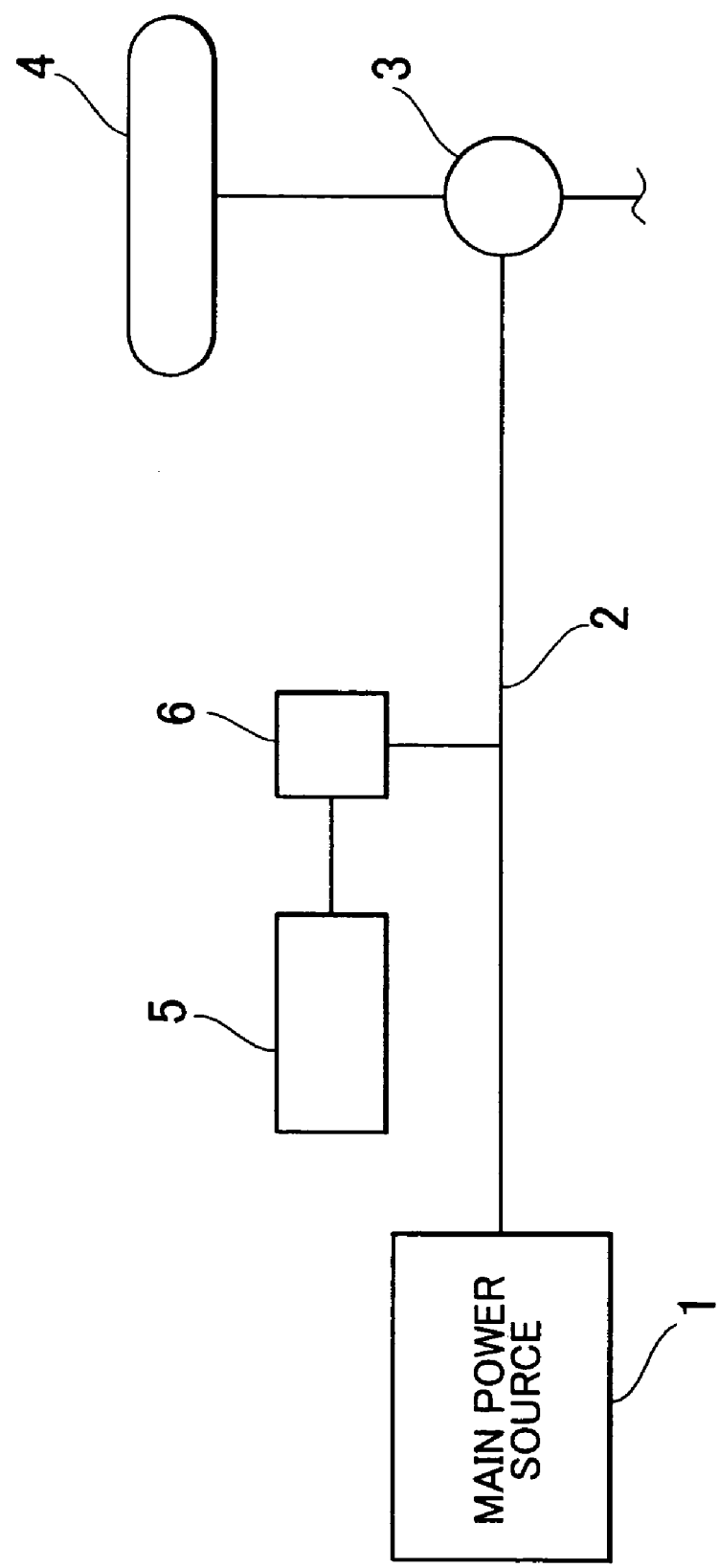
FIG. 2 is a schematic diagram showing a drive apparatus for a hybrid vehicle according to an embodiment of the invention.

An embodiment of the invention will be described. As shown in FIG. 2, in a hybrid drive apparatus, torque of a main power source (i.e., a first power source) 1 is transmitted to an output member 2, and the torque is transmitted from the output member 2 to a drive wheel 4 through a differential 3. Meanwhile, an assist power source (i.e., a second power source) 5 is provided. The assist power source 5 can output driving force for running according to power running control, and regenerate energy according to regenerative control. The assist power source 5 is connected to the output member 2 through a transmission 6. Accordingly, torque transmitted between the assist power source 5 and the output member 2 is increased or decreased according to a gear ratio set in the transmission 6.

The transmission 6 can be configured such that the set gear ratio becomes equal to or greater than "1". With this configuration, when the assist power source 5 outputs torque at the time of power running, the torque output by the assist power source 5 can be increased, and the increased torque can be transmitted to the output member 2. Therefore, capacity or size of the assist power source 5 can be made small. However, since it is preferable to maintain good operating efficiency of the assist power source 5, for example, when the rotational speed of the output member 2 is increased according to a vehicle speed, the gear ratio is reduced so as to decrease the rotational speed of the assist power source 5. Also, when the rotational speed of the output member 2 is decreased, the gear ratio may be increased.

Figure 3:
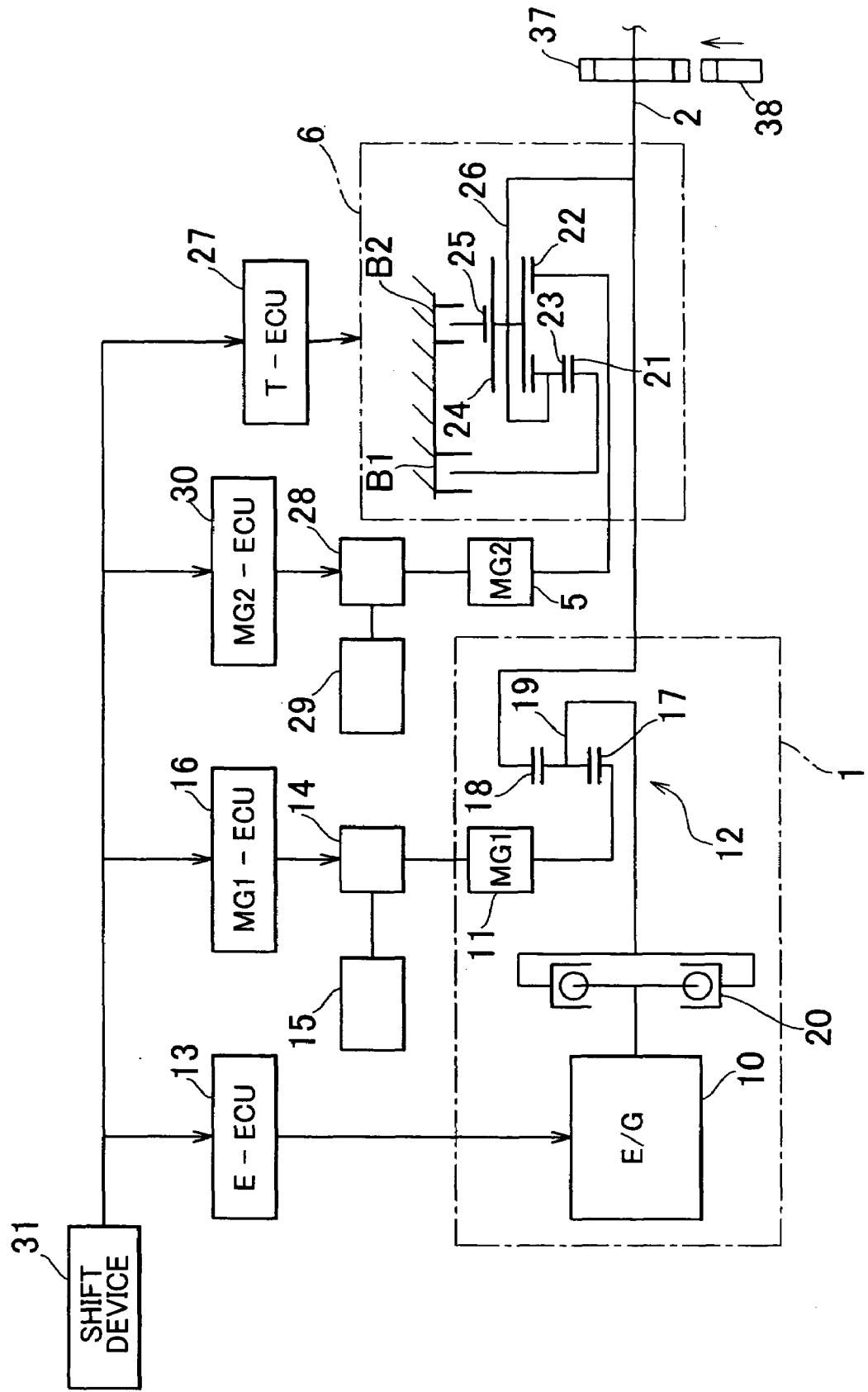
FIG. 3 is a skeleton diagram showing the drive apparatus for a hybrid vehicle according to the invention.

The drive apparatus for a hybrid vehicle will be described more specifically. As shown in FIG. 3, the main power source 1 mainly includes an internal combustion engine (hereinafter, simply referred to as "engine") 10, a motor/generator (hereinafter, referred to as "first motor/generator" or "MG1") 11, and a planetary gear 12 which combines torque of the engine 10 and torque of the first motor/generator 11, and distributing torque to the engine 10 and the first motor/generator 11. The engine 10 is a known power device which outputs power by burning fuel, such as a gasoline engine or a diesel engine. An operating state of the engine 10, such as a throttle valve opening degree (an intake air amount), a fuel supply amount, and ignition timing, can be electrically controlled. The control thereof is performed, for example, by an electronic control unit (E-ECU) 13 which mainly includes a microcomputer.

An example of the first motor/generator 11 is a permanent magnetic synchronous motor. The first motor/generator 11 functions both as the motor and the generator. The first motor/generator 11 is connected, through an inverter 14, to an electric power storage device 15 such as a battery. By controlling the inverter 14, the output torque or regenerative torque of the first motor/generator 11 is appropriately set. In order to perform this control, an electronic control unit (MG1-ECU) 16 which mainly includes a microcomputer is provided. A stator (not shown) of the first motor/generator 11 is fixed, and is not rotated.

Further, the planetary gear mechanism 12 is a known gear mechanism which includes three rotating elements, and which produces a differential effect. The three rotating elements are a sun gear 17 which is an external gear; a ring gear 18 which is an internal gear provided concentrically with the sun gear 17; and a carrier 19 which maintains a pinion that is engaged with the sun gear 17 and the ring gear 18 such that the pinion can be rotated around an axis thereof, and can move around the sun gear 17. The output shaft of the engine 10 is connected, through a damper 20, to the carrier 19 which is a first rotating element. In other words, the carrier 19 serves as an input element.

Meanwhile, the rotor (not shown) of the first motor/generator 11 is connected to the sun gear 17 which is a second rotating element. Accordingly, the sun gear 17 serves as a reaction force element. Also, the ring gear 18 which is a third rotating element serves as an output element. The ring gear 18 is connected to the output member (i.e., the output shaft) 2.

In the example shown in FIG. 3, the transmission 6 includes one set of Ravigneaux type planetary gear mechanism. That is, a first sun gear (S1) 21 and a second sun gear (S2) 22 are provided. Each of the first sun gear 21 and the second sun gear 22 is an external gear. A first pinion 23 is engaged with the first sun gear 21. A second pinion 24 is engaged with the first pinion 23. The second pinion 24 is engaged with a ring gear (R) 25 which is provided concentrically with each of the sun gears 21 and 22. A carrier (C) 26 maintains each of the pinions 23 and 24 such that each of the pinions 23 and 24 can be rotated around the axis thereof, and can be moved around the sun gear. The second sun gear 22 is engaged with the second pinion 24. Accordingly, the first sun gear 21, the ring gear 25, and the pinions 23 and 24 constitute a mechanism equivalent to a double pinion type planetary gear mechanism. The second sun gear 22, the ring gear 25, and the second pinion 24 constitute a mechanism equivalent to a single pinion planetary gear mechanism.

A first brake B1 which selectively fixes the first sun gear 21 is provided. A second brake B2 which selectively fixes the ring gear 25 is provided. Each of the brakes B1 and B2 is a so-called friction engagement device which produces engagement force using frictional force. As the brakes B1 and B2, multiple disc type engagement devices, or band type engagement devices may be employed. Torque capacity of each of the brakes B1 and B2 is continuously changed according to the engagement force caused by hydraulic pressure. Also, the assist power source 5 is connected to the second sun gear 22, and the carrier 26 is connected to the output shaft 2. Further, a parking gear 37 which fixes the output shaft 2 so that a vehicle is maintained in a parked state is fitted to the output shaft 2. Also, a parking lock pole 38 is provided. The parking lock pole 38 is engaged with the parking gear 37 so as to stop the rotation thereof when a parking position is selected by a shifting device (not shown).

Accordingly, in the aforementioned transmission 6, the second sun gear 22 serves as a so-called input element, and the carrier 26 serves as an output element. When the first brake B1 is engaged, a high shift speed is achieved at the gear ratio that is equal to or greater than "1". When the second brake B2 is engaged instead of the first brake B1, a low shift speed is achieved at the gear ratio that is greater than the gear ratio at which the high shift speed is achieved. Shifting between the shift speeds is performed based on a running state such as a vehicle speed and required driving force (or the accelerator angle). More specifically, a shift speed region is defined in advance as a map (shift diagram), and control is performed such that one of the shift speeds is achieved according to the detected running state. In order to perform this control, an electronic control unit (T-ECU) 27 which mainly includes a microcomputer is provided.

In the example shown in FIG. 3, as the assist power source 5, a motor/generator (hereinafter, referred to as "second motor/generator" or "MG2") is employed. This motor/generator 5 can output torque for power running, and can regenerate energy. An example of the second motor/generator 5 is a permanent magnetic synchronous motor. The rotor (not shown) thereof is connected to the second sun gear 22. Further, the second motor/generator 5 is connected to a battery 29 through an inverter 28. The inverter 28 is controlled by an electronic control unit (MG2-ECU) 30 which mainly includes a microcomputer, whereby power running and energy regeneration are controlled, and torque at the time of power running and torque at the time of energy regeneration are controlled. The battery 29 and the electronic control unit 30 can be integrated with the battery (electric power storage device) 15 and the electronic control unit 16. Also, a stator (not shown) of the second motor/generator 5 is fixed, and is not rotated.

Each of the electronic control units 13, 16, 30, 27 receives a shift signal from a shift device 31. According to the shift signal, the rotational speed of the engine 10 and the rotational speeds of the motor/generators 5 and 11 are controlled, and the shift speed is changed in the transmission 6. The shift device 31 can be manually operated. That is, the rotational speed of the engine 10 and the rotational speeds of the motor/generators 5 and 11 can be changed continuously or in a stepwise manner by manual operation.

Figure 4A:
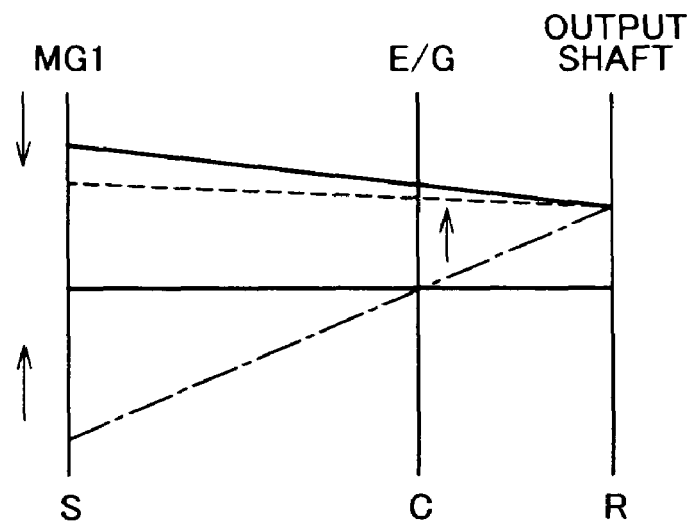
FIG. 4A and FIG. 4B are collinear diagrams relating to the drive apparatus.

FIG. 4A is a collinear diagram relating to the single pinion type planetary gear mechanism 12 which serves as the aforementioned torque combining splitting mechanism. When the reaction torque of the first motor/generator 11 is input to the sun gear (S) 17 against the torque input to the carrier (C) 19 from the engine 10, the torque input to the carrier (C) 19 is increased or decreased according to the torque input to sun gear (S) 17 and the gear ratio of the planetary gear mechanism 12, and the resultant torque is output from the ring gear (R) 18 which is the output element. In this case, the rotor of the first motor/generator 11 is rotated by the torque, and the first motor/generator 11 functions as the generator. Also, when the rotational speed (output rotational speed) of the ring gear 18 is maintained at a constant value, the rotational speed of the engine 10 can be continuously changed by increasing or decreasing the rotational speed of the first motor/generator 11. That is, the rotational speed of the engine 10 can be set to an engine rotational speed at which the fuel efficiency becomes optimal by controlling the first motor/generator 11.

Further, as shown by a chain line in FIG. 4A, when the engine 10 is stopped while the vehicle is running, the first motor/generator 11 is rotated in a reverse direction. When the first motor/generator 11 is caused to function as the motor and to output torque in a normal rotational direction thereafter, torque is applied to the output shaft of the engine 10 which is connected to the carrier 19 so that the output shaft is rotated in the normal rotational direction. Accordingly, the engine 10 can be started (motoring or cranking can be performed) by the first motor/generator 11. In this case, torque is applied to the output shaft 2 in such a direction as to stop the rotation thereof. Accordingly, the driving torque for running can be maintained by controlling the torque output from the second motor/generator 5, and the engine 10 can be smoothly started at the same time. This hybrid type is referred to as "mechanical split type" or "split type".

Figure 4B:
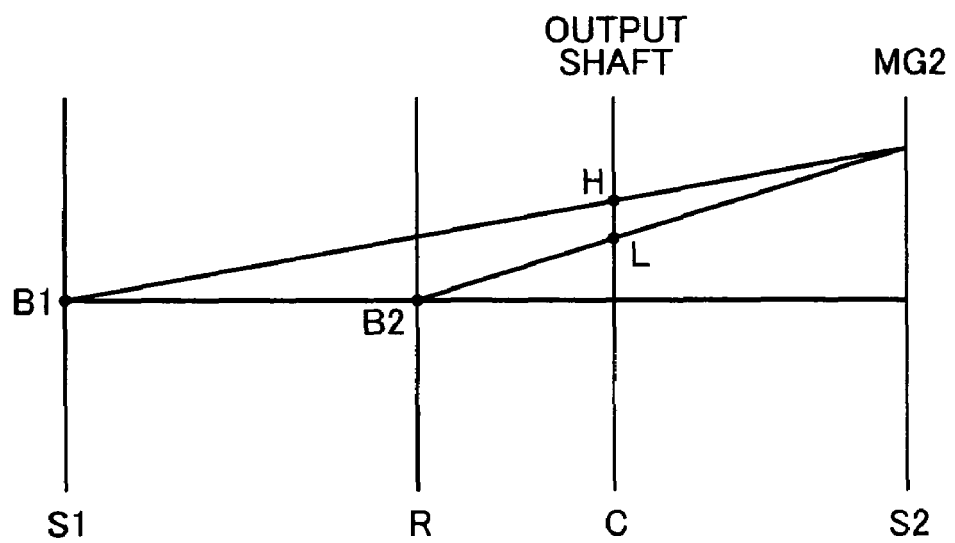

FIG. 4B is a collinear diagram relating to the Ravigneaux type planetary gear mechanism constituting the transmission 6. That is, when the ring gear 25 is fixed by the second brake B2, a low speed L is achieved. The torque output from the second motor/generator 5 is amplified according to the gear ratio, and the amplified torque is applied to the output shaft 2. Meanwhile, when the first sun gear 21 is fixed by the first brake B1, a high speed H is achieved at the gear ratio which is less than the gear ratio at which the low speed L is achieved. The gear ratio at which the high speed H is achieved is also greater than "1". Therefore, the torque output from the second motor/generator 5 is increased according to the gear ratio, and the increased torque is applied to the output shaft 2.

While the shift speed is set to the low speed L or high speed H in a steady state, the output torque of the second motor/generator 5 is increased according to the gear ratio, and the increased torque is applied to the output shaft 2. However, in a shift transition state, the torque applied to the output shaft 2 is influenced by the torque capacity of the brake B1 or B2, inertia torque caused by a change in the rotational speed, and the like. The torque applied to the output shaft 2 is positive torque when the second motor/generator 5 is in a driving state. The torque applied to the output shaft 2 is negative torque when the second motor/generator 5 is in a driven state.

The aforementioned drive apparatus for a hybrid vehicle includes two power sources, that are, the main power source 1 and the assist power source 5. Therefore, these two power sources can be effectively operated so as to improve fuel efficiency and to reduce the amount of exhaust gas. Also, even in a case where the engine 10 is driven, the rotational speed of the engine 10 is controlled using the first motor/generator 11 so that the fuel efficiency becomes optimal. Further, during coasting, inertia energy of the vehicle is recovered to generate electric power. In a case where the second motor/generator 5 is driven for torque assist, when the vehicle speed is low, the shift speed is set to the low speed L in the transmission 6, and the torque applied to the output shaft 2 is increased. When the vehicle speed has become high, the shift speed is set to the high speed H in the transmission 6, and the rotational speed of the second motor/generator 5 is relatively decreased so as to reduce loss, whereby torque assist is efficiently performed.

The aforementioned hybrid vehicle can run using power produced by the engine 10. Also, the hybrid vehicle can run using the engine 10 and the second motor/generator 5. Further, the hybrid vehicle can run using only the second motor/generator 5. One of these running modes is selected based on required driving force, the vehicle speed, and the like. For example, when a charge amount of the battery is sufficient, and the required driving force is relatively small, or when a mode for taking off quietly is manually selected, the running mode in which the vehicle runs using the second motor/generator 5 like an electric vehicle (hereinafter, referred to as "EV running") is selected, and the engine 10 is stopped. For example, when the accelerator pedal is depressed to a large extent thereafter, and the required driving force is increased, when the charge amount of the battery is decreased, or when the mode for taking off quietly is manually changed to a mode for normal running, the engine 10 is started, and the running mode in which the vehicle runs using the engine 10 (hereinafter, referred to as "E/G running") is selected.

Meanwhile, in order to reflect a driver's intention, it is conceivable to change the rotational speed of the engine 10 by changing the rotational speed of the first motor/generator 11 by an instruction directly given by the driver. When the engine 10 is operated in a high rotational speed region according to the driver's instruction, the rotational speed of the first motor/generator 11 is increased. Since electric power generated by the first motor/generator 11 is increased with an increase in the rotational speed of the first motor/generator 11, an amount of electric power generated by the first motor/generator 11 is increased with an increase in the rotational speed of the engine 10. Accordingly, the power which is mechanically transmitted to the output shaft 2 directly from the engine 10 is decreased. Therefore, it is necessary to increase the power which is output from the second motor/generator 5 for power assist.

However, the maximum rating such as the maximum rotational speed and the maximum torque of the second motor/generator 5 may be exceeded; and the required torque and the required rotational speed may not be achieved, depending on a necessary assist amount required of the second motor/generator 5. Also, if the maximum rating of the second motor/generator 5 is increased in order to provide the required torque and the required rotational speed, the size of the second motor/generator 5 is increased.

Thus, it is necessary to change the shift speed of the transmission 6 provided between the second motor/generator 5 and the output shaft 2 according to the necessary power assist amount such that the torque and the rotational speed provided by the second motor/generator 5 are changed to appropriate values. In order to change the torque and the rotational speed provided by the second motor/generator 5 to appropriate values, the following control is performed.

Figure 1:
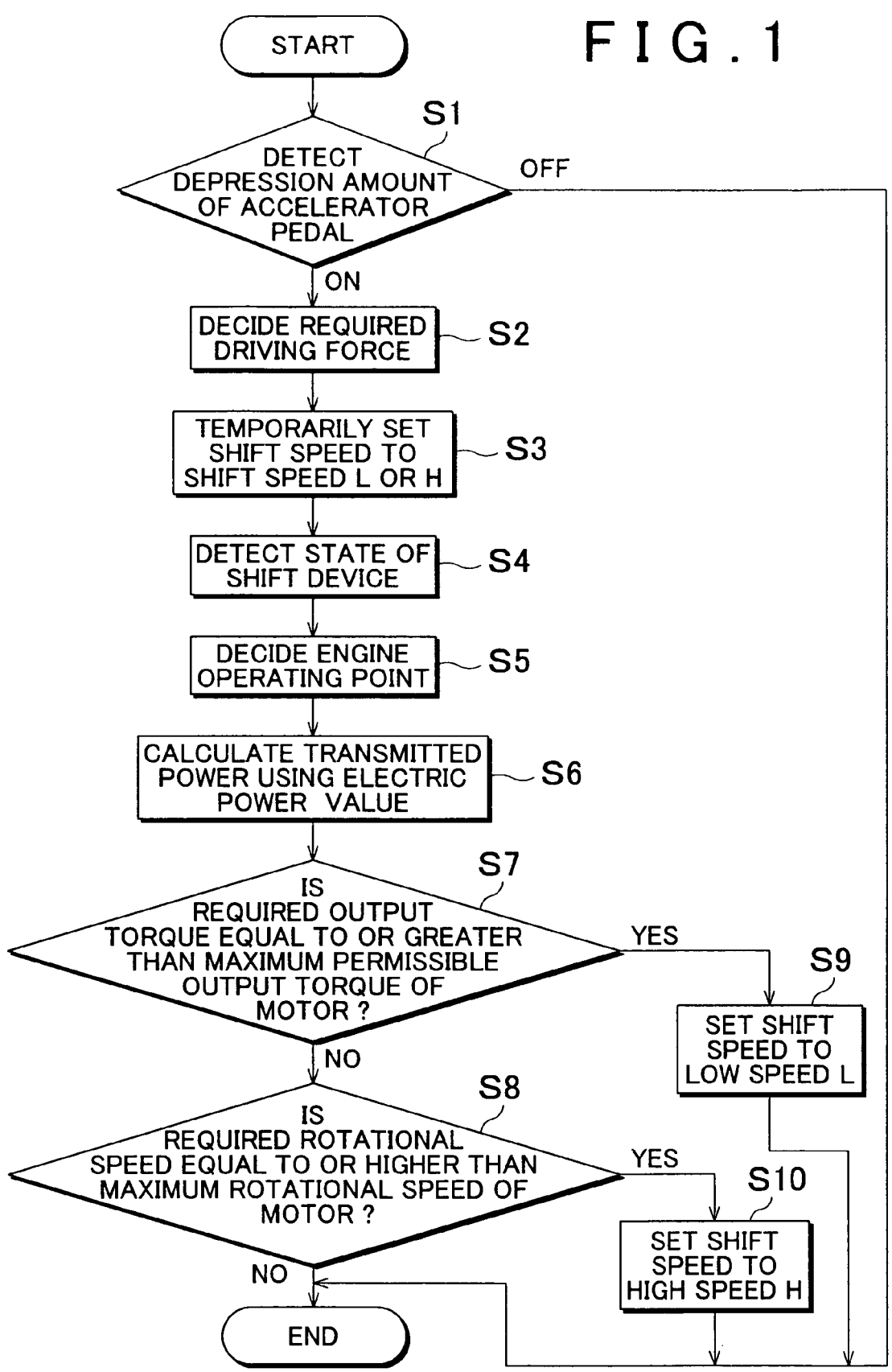
FIG. 1 is a flowchart explaining an example of control performed by a control apparatus according to an embodiment of the invention.

FIG. 1 is a flowchart showing control for changing the shift range (the shift speed or gear ratio) of the transmission 6 according to the necessary power assist amount. Hereafter, the term "shift speed" represents the terms "shift range", "shift speed" and "gear ratio" in the following description, and the description will be made by using the term "shift speed". First, it is determined whether the accelerator pedal is depressed, and a depression amount of the depressed accelerator pedal is detected (step S1).

When a negative determination is made in step S1, that is, when the accelerator pedal is not depressed, no specific process is performed, and the routine is terminated. When an affirmative determination is made in step S1, that is, when the accelerator pedal is depressed, the required driving force is calculated based on the depression amount of the accelerator pedal (step S2). This calculation can be performed, for example, using a map in which the depression amount of the accelerator pedal and the vehicle speed are used as parameters. Then, a shift speed of the transmission 6 is temporarily decided based on the required driving force and the vehicle speed (step S3). The shift speed can be temporarily decided based on a shift diagram shown in FIG. 5 that is made in advance. In this case, a shift speed at which a gear ratio is small is selected a in order to prevent loss due to friction. In step S3, only the shift speed is temporarily decided. The shift speed of the transmission 6 is actually changed in steps subsequent to step S3.

After the shift speed is temporarily decided in step S3, a present shift speed set by the shift device 31 is detected, that is, a shift speed which is the first motor/generator 11, the planetary gear mechanism 12, the second motor/generator 5 and the transmission 6 (step S4). Thus, a target rotational speed of the engine 10 that is manually indicated is detected. After the target rotational speed is detected, an operating point of the engine 10 is decided based on the target rotational speed and the required driving force (step S5).

After the operating point of the engine 10 is decided, output torque of the engine 10 can be obtained. Also, the gear ratio of the planetary gear mechanism 12 constituting the aforementioned torque combining splitting mechanism is obtained in advance. Therefore, the torque which is transmitted to the output shaft 2 from the engine 10 can be obtained. Meanwhile, since the required driving force is obtained in step S2, it is possible to obtain a deficient amount of the torque which is transmitted to the output shaft 2 from the engine 10 after manual operation (downshifting operation for increasing the target engine rotational speed) is performed, with respect to the required driving force. The deficient amount of the torque is provided by the second motor/generator 5. Therefore, required output of the second motor/generator 5 is calculated based on the deficient amount. That is, power that needs to be transmitted to the output shaft 2 using a value of electric power which needs to be supplied to the second motor/generator 5 so that the second motor/generator 5 can generate the required output (step S6).

Since generated electric power from the first motor/generator 11 is input to the second motor/generator 5, required output torque of the second motor/generator 5 is calculated based on the amount of generated electric power from the first motor/generator 11 and the vehicle speed at this time. Then, it is determined whether the required output torque is equal to or greater than the maximum permissible output torque of the second motor/generator 5 (step S7). That is, it is determined whether the required output torque of the second motor/generator 5 exceeds a predetermined upper limit value at the shift speed of the transmission 6 decided temporarily in the step S3.

When a negative determination is made in step S7, that is, when the required output torque of the second motor/generator 5 is less than the maximum permissible output torque of the second motor/generator 5, it is determined whether a required rotational speed of the second motor/generator 5 which is obtained based on the vehicle speed is equal to or higher than the maximum permissible rotational speed of the second motor/generator 5 (step S8). That is, it is determined whether the required rotational speed of the second motor/generator 5 exceeds a predetermined upper limit value at the shift speed of the transmission 6 decided temporarily in the step S3.

When a negative determination is made in step S8, that is, when the required rotational speed of the second motor/generator 5 that is obtained based on the vehicle speed is lower than the maximum permissible rotational speed of the second motor/generator 5, the routine is terminated. Then, the shift speed of the transmission 6 which is temporarily decided is achieved in the transmission 6.

When an affirmative determination is made in step S7, that is, when the required output torque of the second motor/generator 5 is equal to or greater than the maximum permissible output torque, the output torque of the second motor/generator 5 needs to be amplified. Therefore, the shift speed of the transmission 6 is changed to the low speed L (step S9).

Further, when an affirmative determination is made in step S8, that is, when the required rotational speed of the second motor/generator 5 which is obtained based on the vehicle speed is equal to or higher than the maximum permissible rotational speed of the second motor/generator 5, the output rotational speed of the second motor/generator 5 needs to be increased. Therefore, the shift speed of the transmission 6 is changed to the high speed H (step S10).

Figure 5:
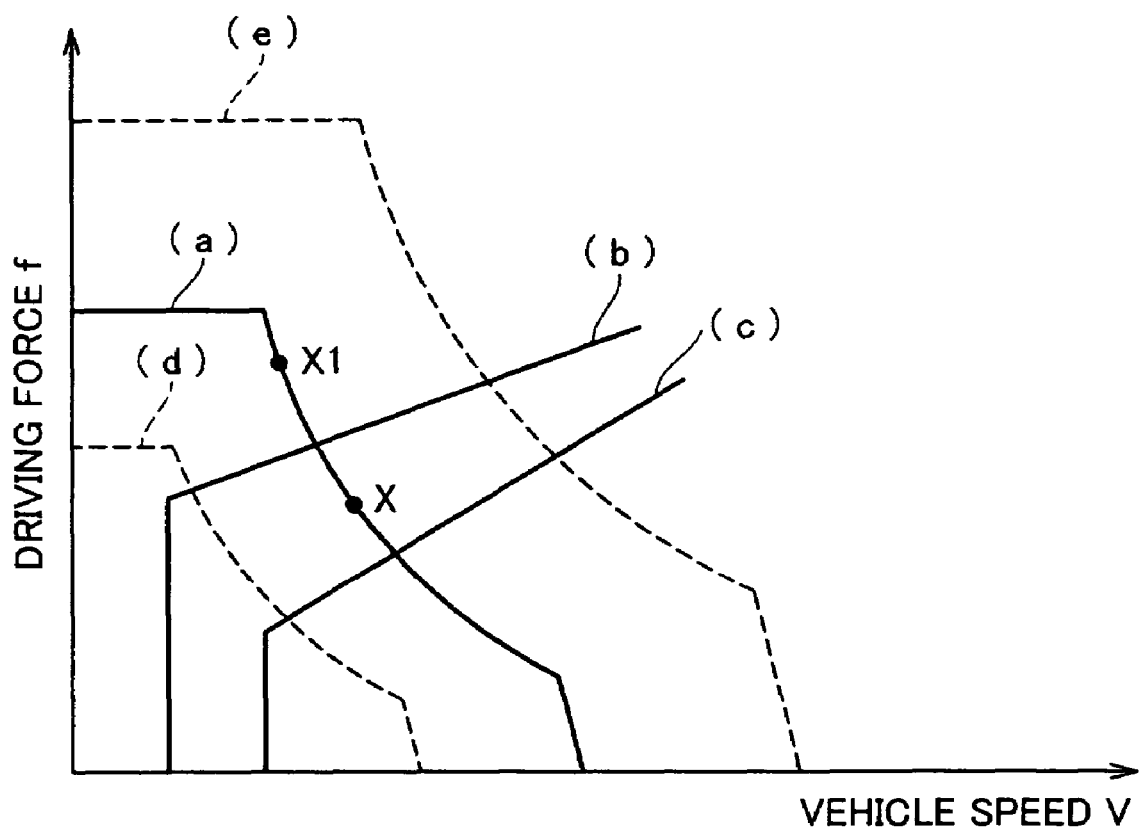
FIG. 5 is a diagram showing a relationship between a vehicle speed and a driving force in relation to a second motor/generator.

Next, an example of the aforementioned control will be described, with reference to FIG. 5 which is a diagram showing the relationship between the vehicle speed and the driving force in the aforementioned hybrid vehicle. In FIG. 5, a horizontal axis indicates a vehicle speed V, a vertical axis indicates driving force f, lines (a), (d), (e) are load curves, a line (b) is a downshift line relating to the transmission 6, and a line (c) is an upshift line relating to the transmission 6.

While the accelerator pedal is depressed at a given angle, and the vehicle is running at a given vehicle speed, an affirmative determination is made in the aforementioned step S1, and the required driving force f is calculated in step S2. Then, the shift speed which should be set in the transmission 6 is temporarily decided based on the vehicle speed V and the required driving force f at this time, using the diagram in FIG. 5. This process of temporarily deciding the shift speed of the transmission 6 is performed in the aforementioned step S3. It is assumed that the operating state at this time is shown by a point X in FIG. 5, and the shift speed is set to the high speed H in the transmission 6.

Figure 6:
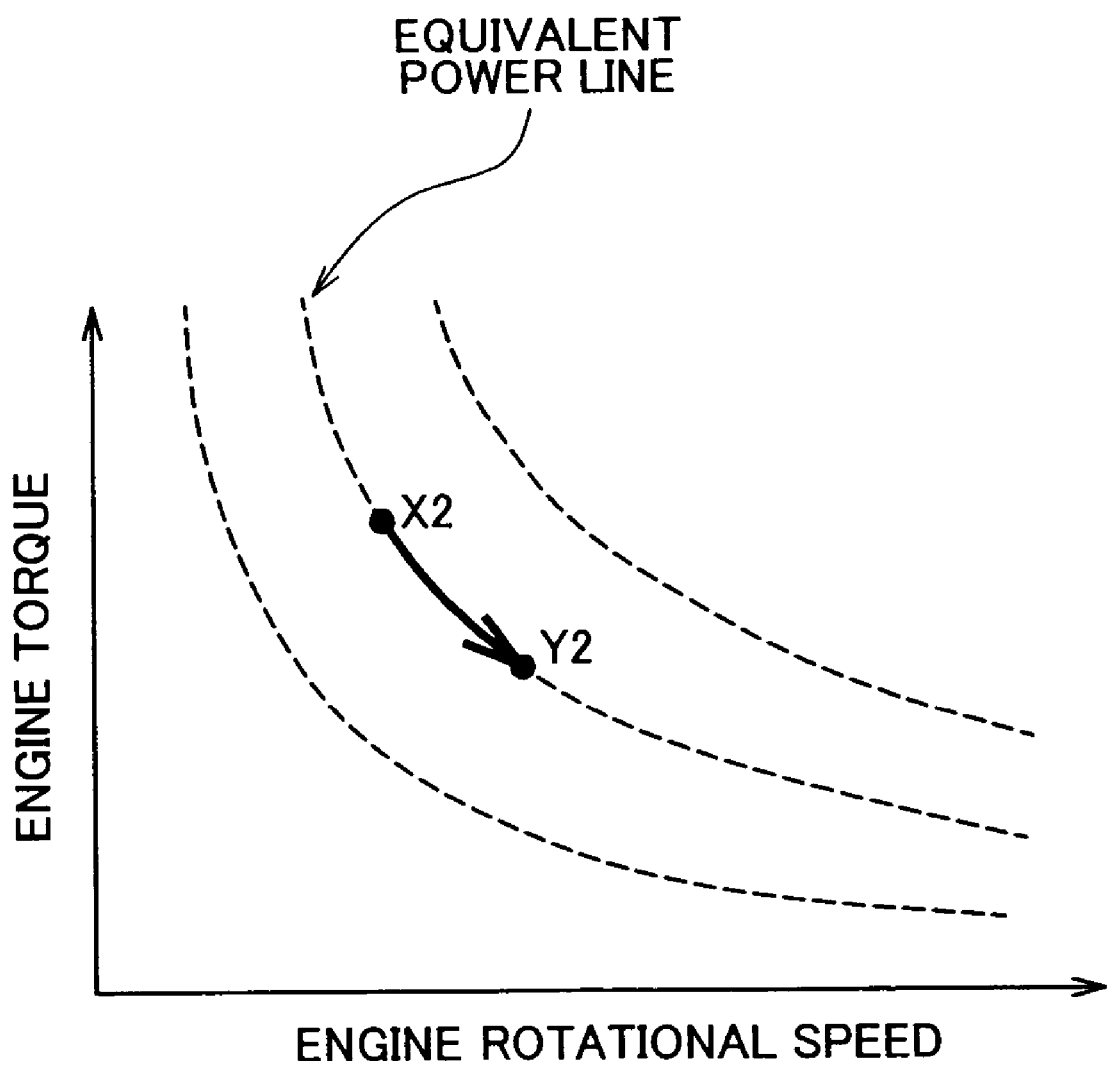
FIG. 6 is a diagram showing an engine operating point.

When the downshifting operation is manually performed in this state, since the accelerator angle is not changed, the operating point of the engine 10 is changed to a point on a high rotational speed and low torque side. As a result, as shown in FIG. 6, the engine operating point is changed from a point X2 to a point Y2. Thus, the engine torque is decreased, and the torque that is directly transmitted from the engine to the output shaft is decreased. The power of the second motor/generator 5 required for compensating for a decrease in the driving force is calculated. This process of calculating the required power of the second motor/generator 5 is performed in the aforementioned step S6.

Accordingly, when the so-called downshifting operation is manually performed, the point X is not changed in the diagram showing the relationship between the vehicle speed and the driving force in FIG. 5. Therefore, the shift speed is not changed in the transmission 6. However, in a case where the torque of the second motor/generator 5 exceeds the predetermined upper limit value such as the maximum permissible torque if the output of the second motor/generator 5 calculated in step S6 is achieved, the shift speed is set to the low speed L in the transmission 6, even when the operating point is in a high shift speed region in the diagram in FIG. 5. This control is performed in the aforementioned step S9. As a result, it is possible to provide the required driving force without increasing the output or size of the second motor/generator 5.

The same is true for the rotational speed of the second motor/generator 5. That is, if the power of the second motor/generator 5 calculated in step S6 is achieved, the operating point is shown by a point X1 and the shift speed is set to the low speed L. Accordingly, in a case where the rotational speed of the second motor/generator 5 exceeds the predetermined upper limit value such as the maximum permissible rotational speed, the shift speed is set to the high speed H in the transmission 6, even when the operating point is in the low shift speed region in the diagram in FIG. 5. This control is performed in the aforementioned step S10. As a result, it is possible to avoid the situation in which, for example, a low rotational speed and high torque type second motor/generator 5 is employed, and therefore the size of the second motor/generator 5 is increased. Accordingly, it is possible to provide the required driving force without increasing the output or size of the motor/generator 5.

In brief, the required driving force is detected based on the accelerator angle and the vehicle speed when the rotational speed of the engine 10 is changed, and the required torque is calculated based on the detected required driving force. Then, the calculated required torque is compared to the maximum permissible torque of the second motor/generator 5. When the required torque is greater than the maximum permissible torque, the shift speed of the transmission 6 is changed so that the rotational speed of the output shaft 2 is decreased. Therefore, the output torque of the transmission 6 can be increased. Thus, it is possible to provide the required torque, and to prevent an increase in the size of the second motor/generator 5.

Also, the required driving force is detected based on the accelerator angle and the vehicle speed when the rotational speed of the engine 10 is changed, and the required rotational speed is calculated based on the detected required driving force. Then, the calculated required rotational speed is compared to the maximum permissible rotational speed of the second motor/generator 5. When the calculated required rotational speed is higher than the maximum permissible rotational speed of the second motor/generator 5, shift speed of the transmission 6 is changed so as to increase the rotational speed of the output shaft 2. Therefore, the output rotational speed of the transmission 6 can be increased. Thus, it is possible to achieve the required rotational speed, and to prevent an increase in the size of the second motor/generator 5. Similarly, when the power that can be output from the motor is changed due to a change in the rotational speed thereof, it is possible to output the power required of the second motor/generator 5 by changing the shift speed of the transmission 6.

The output shaft 2 in the aforementioned embodiment can be regarded as "output member" according to the invention. Functional means for performing step S2 can be regarded as "first detection means" according to the invention. Functional means for performing step S6 can be regarded as "required torque detection means" and "required rotational speed detection means" according to the invention. Functional means for performing step S7 can be regarded as "comparison means" according to the invention. Functional means for performing step S8 can be regarded as "rotational speed comparison means" according to the invention. Further, functional means for performing step S9 and step S10 can be regarded as "shifting control means" and "gear ratio reduction means" according to the invention.

In the invention, "the internal combustion engine" and "the driving power source" are different from each other in a principle of generating driving force. In the embodiment, "the internal combustion engine" converts thermal energy to kinetic energy. However, instead of the "internal combustion engine", any device such as "an external combustion engine" may be employed, as long as the device converts thermal energy to kinetic energy.

Step S8 and step S10 may be omitted. Also, step S7 and step S9 may be omitted.

What is claimed is:

1. A control apparatus for a hybrid vehicle in which a conversion device that converts thermal energy to kinetic energy, a first driving force source that has a function of generating electric power, and an output member are connected to each other through a power splitting mechanism that produces a differential effect; a second driving force source is connected to the output member through a transmission in which a gear ratio can be changed; and a manual changing device that changes, according to manual operation, a driven state of the output member that depends on a driving state of the conversion device and a driving state of the second driving force source is provided, comprising:
    a first detection device which detects required driving force of the vehicle;
    a second detection device which obtains a required output value that is a value of required output of the second driving force source, based on the detected required driving force when the driven state of the output member that depends on the driving state of the conversion device and the driving state of the second driving force source is changed by the manual changing device;
    a comparison device which compares the obtained required output value to an upper limit value of output that can be transmitted to the output member from the second driving force source at the gear ratio of the transmission after the driven state of the output member is changed; and
    a shifting control device which adjusts the gear ratio of the transmission so as to increase the upper limit value when the obtained required output value is greater than the upper limit value.

2. The control apparatus according to claim 1, wherein the conversion device is an internal combustion engine.

3. The control apparatus according to claim 1, wherein the shifting control device adjusts the gear ratio of the transmission so that the upper limit value becomes equal to the obtained required output value.

4. A control apparatus for a hybrid vehicle in which an internal combustion engine, a first driving force source that has a function of generating electric power, and an output member are connected to each other through a power splitting mechanism that produces a differential effect; a second driving force source is connected to the output member through a transmission in which a gear ratio can be changed; and a manual changing device that changes, according to manual operation, a driven state of the output member that depends on the driving state of the internal combustion engine and the driving state of the second driving force source is provided, comprising:

a first detection device which detects required driving force of the vehicle;

a required torque detection device which obtains required output torque of the second driving force source, based on the detected required driving force when the driven state of the output member that depends on a driving state of the internal combustion engine and a driving state of the second driving force source is changed by the manual changing device;

a comparison device which compares the obtained required output torque to an upper limit value of torque that can be transmitted to the output member from the second driving force at the gear ratio of the transmission after the driven state of the output member is changed; and a shifting control device which increases the gear ratio of the transmission when the required output torque is greater than the upper limit value.

5. The control apparatus according to claim 4, wherein the required torque detection device obtains a deficient amount of torque which is transmitted to the output shaft from the internal combustion engine with respect to the detected required driving force, based on the detected required driving force, output torque of the internal combustion engine, and a gear ratio of the power splitting mechanism; and the required torque detection device obtains the required output torque of the second driving force source based on the deficient amount.

6. The control apparatus according to claim 4, wherein the required torque detection device obtains a required rotational speed of the second driving force source based on the detected require driving force when the required output torque is equal to or less than the upper limit value; the comparison device compares the obtained required rotational speed to a predetermined upper limit value of the rotational speed of the second driving force source at the gear ratio of the transmission after the driven state of the output member is changed; and shifting control device reduces the gear ratio of the transmission when the obtained required rotational speed is higher than the predetermined upper limit value.

7. A control method for a hybrid vehicle in which a conversion device that converts thermal energy to kinetic energy, a first driving force source that has a function of generating electric power, and an output member are connected to each other through a power splitting mechanism that produces a differential effect; a second driving force source is connected to the output member through a transmission in which a gear ratio can be changed; and a manual changing device that changes, according to manual operation, a driven state of the output member that depends on a driving state of the conversion device and a driving state of the second driving force source is provided, comprising:

obtaining required driving force of the vehicle;

obtaining a required output value that is a value of required output of the second driving force source, based on the obtained required driving force when the driven state of the output member that depends on the driving state of the conversion device and the driving state of the second driving force source is changed by the manual changing device;

comparing the obtained required output value to an upper limit value of output that can be transmitted to the output member from the second driving force source at the gear ratio of the transmission after the driven state of the output member is changed; and adjusting the gear ratio of the transmission so as to increase the upper limit value when the obtained required output value is greater than the upper limit value.

8. The control method according to claim 7, wherein obtaining the required output value includes obtaining required output torque of the second driving force source as the required output value; comparing the obtained required output value to the upper limit value includes comparing the obtained required output torque to an upper limit value of torque that can be transmitted to the output member from the second driving force source; and adjusting the gear ratio of the transmission includes increasing the gear ratio of the transmission when the obtained required output torque is greater than the upper limit value of torque that can be transmitted to the output member from the second driving force source.

* * * * *